US008938340B2

(12) United States Patent
Teslak et al.

(10) Patent No.: US 8,938,340 B2
(45) Date of Patent: *Jan. 20, 2015

(54) AUTOMATIC TRANSMISSION SHIFT CONTROL BASED ON CLUTCH TORQUE CAPACITY DETECTION USING CALCULATED TRANSMISSION INPUT TORQUE

(71) Applicant: Ford Global Technologies, LLC, Dearborn, MI (US)

(72) Inventors: Christopher John Teslak, Plymouth, MI (US); Yuji Fujii, Ann Arbor, MI (US); Seung-Hoon Lee, Northville, MI (US); Bradley Dean Riedle, Northville, MI (US); Michael Glenn Fodor, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 22 days.

This patent is subject to a terminal disclaimer.

(21) Appl. No.: 13/800,412

(22) Filed: Mar. 13, 2013

(65) Prior Publication Data

US 2014/0277974 A1  Sep. 18, 2014

(51) Int. Cl.
*B60W 10/11* (2012.01)
*B60W 10/06* (2006.01)

(52) U.S. Cl.
CPC ............. *B60W 10/11* (2013.01); *B60W 10/06* (2013.01)
USPC ............................................ 701/54; 477/111

(58) Field of Classification Search
USPC ........................................... 701/54; 477/111
See application file for complete search history.

(56) References Cited

U.S. PATENT DOCUMENTS

| 4,724,723 A | 2/1988 | Lockhart et al. |
| 4,744,031 A | 5/1988 | Takeda et al. |
| 4,790,418 A | 12/1988 | Brown et al. |
| 4,792,902 A | 12/1988 | Hrovat et al. |
| 4,855,914 A | 8/1989 | Davis et al. |
| 5,058,015 A | 10/1991 | Leorat |
| 5,092,182 A | 3/1992 | Ikeda et al. |
| 5,105,357 A | 4/1992 | Steeby |
| 5,133,227 A | 7/1992 | Iwatsuki |
| 5,165,286 A | 11/1992 | Hamamura et al. |
| 5,188,005 A | 2/1993 | Sankpal et al. |
| 5,573,477 A | 11/1996 | Desautels et al. |
| 5,669,851 A | 9/1997 | Tietze |
| 5,839,987 A | 11/1998 | Sawamura et al. |

(Continued)

FOREIGN PATENT DOCUMENTS

JP  05087227  4/1993

*Primary Examiner* — Mary Cheung
*Assistant Examiner* — Yuen Wong
(74) *Attorney, Agent, or Firm* — David B. Kelley; Brooks Kushman P.C.

(57) ABSTRACT

A system and method for controlling a vehicle powertrain having a transmission to improve shift quality is based on detection of an initial rise time of an on-coming clutch torque capacity, which indicates the start of the torque phase. The initial rise time is detected using a transmission input shaft torque computation. The system may include a vehicle powertrain having an engine, a transmission coupled to the engine via a torque converter and a controller configured to initiate torque phase control when a difference between a first transmission input shaft torque and a second transmission input shaft torque exceeds a first predetermined threshold parameter during a shift event characterized by a preparatory phase, a torque phase and an inertia phase.

15 Claims, 4 Drawing Sheets

(56) References Cited

U.S. PATENT DOCUMENTS

| | | | |
|---|---|---|---|
| 6,047,605 A | 4/2000 | Garshelis | |
| 6,145,387 A | 11/2000 | Garshelis | |
| 6,243,637 B1 | 6/2001 | Minowa et al. | |
| 6,246,941 B1 | 6/2001 | Sayman | |
| 6,260,423 B1 | 7/2001 | Garshelis | |
| 6,278,926 B1 | 8/2001 | Jain et al. | |
| 6,482,125 B2 | 11/2002 | Urasawa | |
| 6,487,925 B2 | 12/2002 | Fischer et al. | |
| 6,490,934 B2 | 12/2002 | Garshelis | |
| 6,553,847 B2 | 4/2003 | Garshelis | |
| 6,698,299 B2 | 3/2004 | Cripe | |
| 6,846,260 B2 | 1/2005 | Horiuchi | |
| 6,949,051 B2 | 9/2005 | Katakura | |
| 6,969,340 B2 | 11/2005 | Tokura et al. | |
| 6,991,584 B2 | 1/2006 | Cowan | |
| 7,178,618 B2 | 2/2007 | Komeda et al. | |
| 7,243,557 B2 | 7/2007 | May | |
| 7,300,381 B2 | 11/2007 | Badillo et al. | |
| 7,351,183 B2 | 4/2008 | Fujii et al. | |
| 7,478,572 B2 | 1/2009 | Maten et al. | |
| 7,503,875 B2 | 3/2009 | Fujii et al. | |
| 8,290,668 B2 | 10/2012 | Hirasako et al. | |
| 2002/0025885 A1 | 2/2002 | Saito et al. | |
| 2004/0242374 A1 | 12/2004 | Wheals | |
| 2006/0135316 A1 | 6/2006 | Fujii et al. | |
| 2006/0154781 A1 | 7/2006 | Petzold et al. | |
| 2008/0139362 A1 | 6/2008 | Fujii et al. | |
| 2009/0171545 A1 | 7/2009 | Shimizu et al. | |
| 2010/0292901 A1 | 11/2010 | Ortmann et al. | |
| 2010/0318269 A1 | 12/2010 | Yanakiev et al. | |
| 2011/0184612 A1* | 7/2011 | Fujii et al. ................ 701/54 | |
| 2012/0130608 A1 | 5/2012 | Fujii et al. | |
| 2012/0130610 A1 | 5/2012 | Lee et al. | |

* cited by examiner

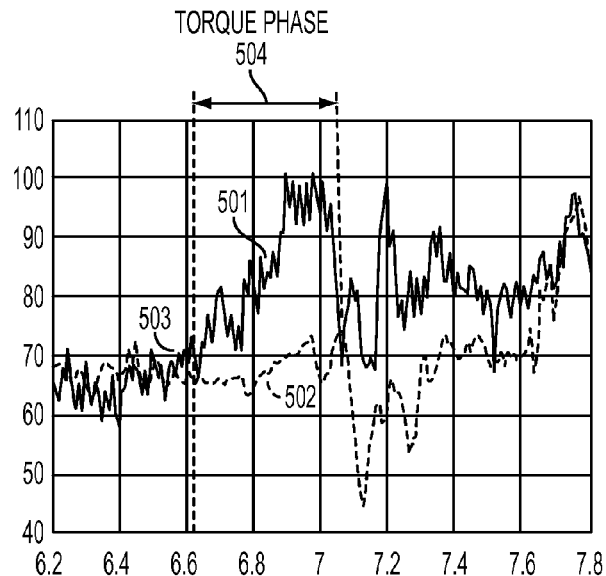
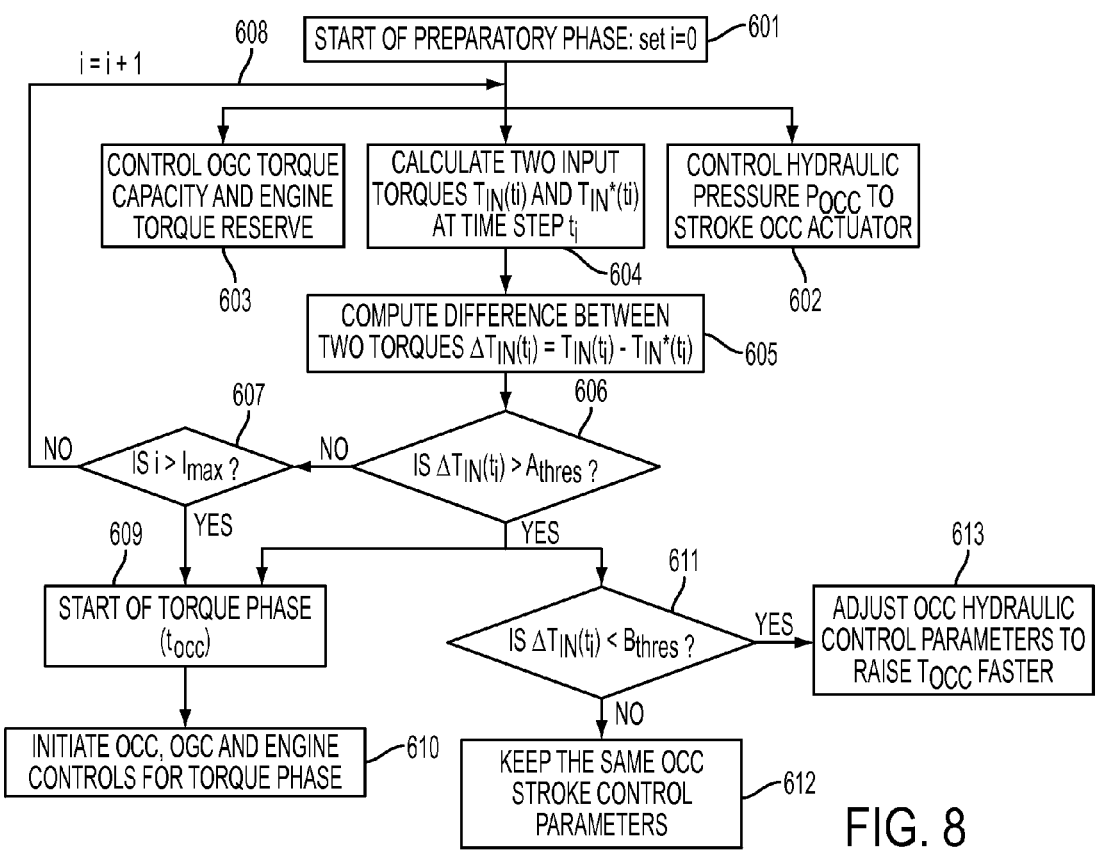
FIG. 7
FIG. 8

AUTOMATIC TRANSMISSION SHIFT CONTROL BASED ON CLUTCH TORQUE CAPACITY DETECTION USING CALCULATED TRANSMISSION INPUT TORQUE

TECHNICAL FIELD

The present disclosure relates to multiple-ratio automatic transmissions for use in automotive vehicles and to a control strategy for effecting engagement and release of transmission friction torque establishing elements during a ratio change.

BACKGROUND

A multiple-ratio automatic transmission in an automotive vehicle powertrain utilizes multiple friction elements for automatic gear ratio shifting. In general, these friction elements may be described as torque establishing elements although more commonly they are referred to as clutches or brakes. The friction elements establish power flow paths from an internal combustion engine to vehicle traction wheels. During acceleration of the vehicle, the overall speed ratio, which is the ratio of a transmission input shaft speed to a transmission output shaft speed, is reduced as vehicle speed increases for a given accelerator pedal demand as the transmission upshifts through the various ratios.

In the case of a synchronous upshift, a first torque establishing element, referred to as an off-going clutch (OGC), is released while a second torque establishing element, referred to as an on-coming clutch (OCC), is engaged to lower a transmission gear ratio and change the torque flow path through the transmission. A typical upshift event is divided into a preparatory phase, a torque phase, and an inertia phase. During the preparatory phase, the OCC is stroked to prepare for its engagement while the OGC torque-holding capacity is reduced as a step toward its release. During the torque phase, which may be referred to as a torque transfer phase, the OGC torque is reduced toward a value of zero or a non-significant level to prepare it for disengagement. Simultaneously, the OCC torque is raised from a non-significant level, thereby initiating engagement of the OCC according to a conventional upshift control strategy. The timing of the OCC engagement and the OGC disengagement results in a momentary activation of two torque flow paths through the gearing, thereby causing torque delivery to drop momentarily at the transmission output shaft. This condition, which can be referred to as a "torque hole," occurs before disengagement of the OGC. A vehicle occupant can perceive a "torque hole" as an unpleasant shift shock. When the OCC develops enough torque, the OGC is released, marking the end of the torque phase and the beginning of the inertia phase. During the inertia phase, the OCC torque is adjusted to reduce its slip speed toward zero. When the OCC slip speed reaches zero, the shift event is completed.

In a synchronous shift, the timing of the OGC release should be synchronized with the OCC torque level to deliver a consistent shift feel. During a typical upshift event, OCC torque capacity ($T_{OCC}$) must be raised in a consistent manner under all operating conditions to deliver a smooth shift quality. In particular, the accurate knowledge of an initial rise time ($t_{OCC}$) of $T_{OCC}$, which indicates the start of the torque phase, is desired to control other torque-generating devices, including an engine, clutches, and an electric motor, in a synchronized manner during shifting. Mismatched control timings between OCC and other torque-generating devices result in inconsistent shift quality or a perceivable shift shock. A hydraulic pressure transducer may be utilized to monitor OCC actuator pressure, but an accurate detection of $t_{OCC}$ remains a challenge under various operating conditions. As such, there is a need to accurately detect the $t_{OCC}$ of $T_{OCC}$ under all conditions for improving automatic transmission shift control.

SUMMARY

A system and method for detecting an initial rise time of on-coming clutch torque capacity during a shift event for an automatic transmission adjust the on-coming clutch actuator control parameters to induce a detectable slope change or an upward blip in an input shaft torque profile and detect the slope change using at least one input shaft torque computation. The onset of the slope change corresponds to the initial rise time. The disclosure also provides a system and method to adjust clutch actuator stroke control parameters to increase the slope of subsequent shift events for enhancing the detectability of the initial rise time. Embodiments of this disclosure may be used in various shift control applications where the synchronization of control timing is desired.

In one embodiment, a vehicle powertrain having a transmission includes an engine and a transmission coupled to the engine by a torque converter, where the transmission includes at least one gear set defining multiple torque flow paths from an input shaft of the transmission to an output shaft of the transmission. The vehicle powertrain may also include a controller configured to initiate torque phase control when a difference between a first calculated transmission input shaft torque and a second calculated transmission input shaft torque exceeds a first predetermined threshold parameter during a shift event characterized by a preparatory phase, a torque phase and an inertia phase.

In another embodiment, a method for controlling a vehicle having a transmission includes commanding an upshift event of the transmission, where the upshift event is characterized by a preparatory phase followed by a torque phase. The method may also include initiating torque phase control when a time derivative of the calculated transmission input shaft torque exceeds a first predetermined threshold parameter, or after a predetermined time from initiation of the preparatory phase. Embodiments may further include initiating torque phase control when a difference between a first calculated transmission input shaft torque and a second calculated transmission input shaft torque exceeds a corresponding threshold parameter. Transmission input shaft torque may be calculated based on various vehicle operating parameters such as a torque converter impeller speed, transmission input shaft speed (or torque converter turbine speed), torque converter torque capacity factor, torque converter torque ratio, transmission output speed, vehicle acceleration, vehicle mass, final drive ratio, and vehicle wheel radius.

Embodiments according to the present disclosure provide various advantages. For example, various embodiments provide a more accurate indication of the initial rise time of the on-coming clutch torque capacity, which indicates the start of the torque phase, to control other torque-generating devices, including an engine, clutches, and an electric motor in hybrid vehicle applications, in a synchronized manner during shifting. Use of an induced slope change in the input torque profile according to various embodiments facilitates more robust detection of initiation of the torque phase of an upshift. More robust detection of the initiation of the torque phase facilitates coordinated torque phase control of an on-coming clutch, off-going clutch, and input torque source(s) in a synchronized manner.

The above advantages and other advantages and features will be readily apparent from the following detailed description of the preferred embodiments when taken in connection with the accompanying drawings.

BRIEF DESCRIPTION OF THE DRAWINGS

FIG. 7 illustrates two transmission input shaft torque profiles according to an embodiment of the present disclosure; and FIG. 8 illustrates a flowchart describing a control sequence operation of an upshift control system or method in accordance with another embodiment of the present disclosure.

DETAILED DESCRIPTION

As required, detailed embodiments of the claimed subject matter are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments of the claimed subject matter.

The shifting of a multiple-ratio automatic transmission is accompanied by applying and/or releasing multiple friction elements (such as plate clutches, band-brakes, etc.) that change speed and torque relationships by altering gear configurations. Friction elements may be actuated hydraulically, mechanically or through other strategies using one or more associated actuators that may be in communication with a microprocessor-based controller implementing a particular control strategy based on signals received from one or more sensors. A realizable combination of gear configurations determines a total number of ratio steps. Although various planetary and lay-shaft gear configurations are found in modern automatic transmissions, the basic principle of shift kinematics is similar.

During a typical synchronous upshift event from a lower gear configuration to a higher gear configuration, both the gear ratio (defined as automatic transmission input shaft speed/output shaft speed) and the torque ratio (defined as automatic transmission output shaft torque/input shaft torque) become lower. During the upshift event, a friction element (referred to as an off-going clutch (OGC)) associated with the lower gear configuration disengages while a different friction element (referred to as an on-coming clutch (OCC)) associated with a higher gear configuration engages.

Figure 1:
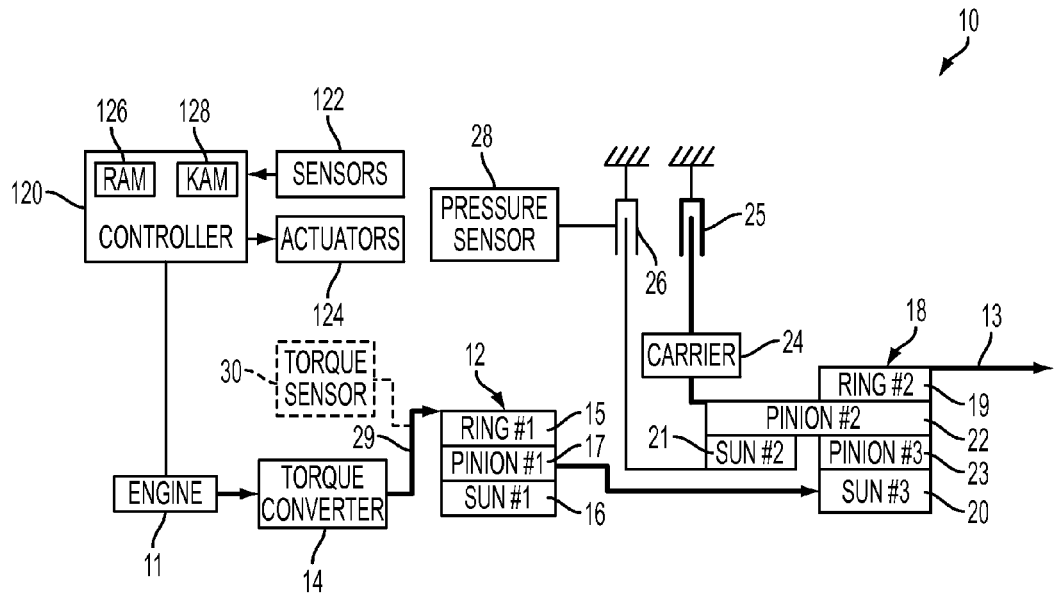
FIG. 1 illustrates a schematic representation of a multiple-ratio automatic transmission according to embodiments of the present disclosure in a low gear configuration.
Figure 2:
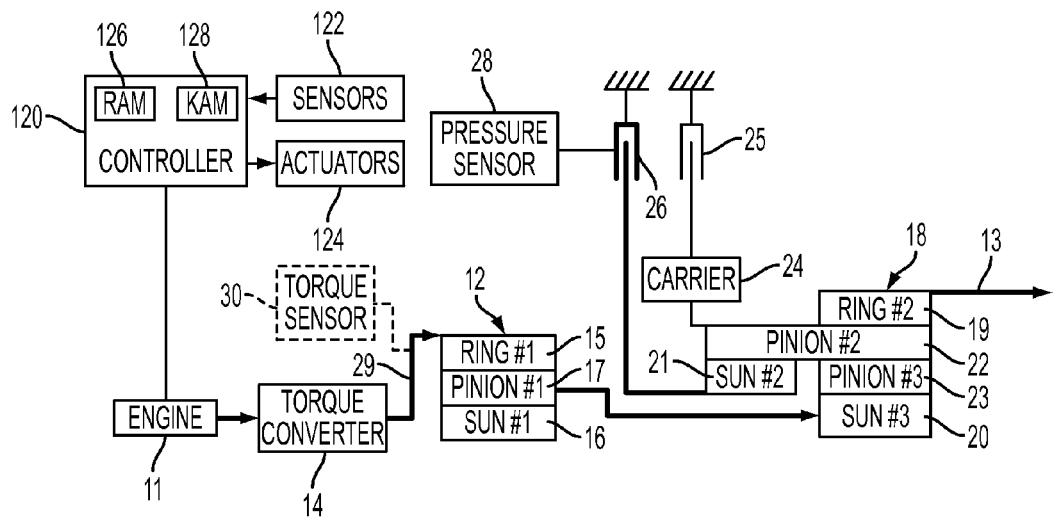
FIG. 2 illustrates a schematic representation of a multiple-ratio automatic transmission according to embodiments of the present disclosure in a high gear configuration.

Referring now to FIGS. 1 and 2, schematic representations of a multiple-gear automatic transmission for use in an automotive powertrain are shown. As explained in greater detail below, transmission 10 has a representative low gear configuration illustrated in FIG. 1 and a representative high gear configuration illustrated in FIG. 2

Although the powertrain shown in FIGS. 1 and 2 includes a torque converter at the torque input side of transmission 10, various embodiments of the present disclosure can be used as well in a hybrid powertrain that includes, for example, an engine and an electric motor without a torque converter. In a hybrid configuration, the power of the engine is complemented by the power generated electrically by the motor. Further, the specific gearing arrangement illustrated in FIGS. 1 and 2 can be replaced by other gearing arrangements that establish multiple torque flow paths from a power source (e.g., engine and/or motor) to an output shaft.

The powertrain shown in FIGS. 1 and 2 includes an internal combustion engine 11 coupled to a simple planetary gear set 12 of a multiple ratio transmission 10 by a torque converter 14. The simple planetary gear set 12 includes ring gear 15, pinion gears 17 and sun gear 16. Torque is delivered by the torque converter to ring gear 15. Sun gear 16, which is grounded, acts as a reaction element as torque is delivered by a planetary carrier for pinion gears 17, which engage ring gear 15 and sun gear 16.

A compound planetary gear set 18 includes a ring gear 19, which is driveably connected to an output shaft 13. Sun gear 20 acts as a torque input element for compound planetary gear set 18. A second sun gear 21 engages long pinion gears 22, which in turn engage ring gear 19 and short pinion gears 23. Sun gear 20 also engages pinion gears 23. The pinion gears form a compound pinion gear assembly supported on carrier 24, which can be selectively braked by clutch 25 (i.e., OGC). Sun gear 21 can be selectively braked by clutch 26 (i.e., OCC).

A controller 120 may include various types of computer readable storage media to implement volatile and/or persistent memory. In the representative embodiment of FIGS. 1 and 2, controller 120 includes volatile random access memory (RAM) 126 and persistent keep-alive memory (KAM) 128. Various other types of memory or storage (not shown) may also be provided, such as read-only memory (ROM). Controller 120 is in communication with one or more sensors 122 and actuators 124. Sensors 122 may include a pressure sensor 28, and various speed sensors (not shown) that provide signals indicative of rotational speed of associated components, such as speed of engine 11, input shaft 29, and output shaft 13, for example. In some embodiments, sensors 122 include a torque sensor 30 positioned to measure torque of input shaft 29. Torque sensor 30 may be implemented by a strain-gauge based system, a piezoelectric load cell, or a magneto-elastic torque sensor as described in greater detail in U.S. Pat. Nos. 6,266,054; 6,145,387; 6,047,605; 6,553,847; and 6,490,934, for example, the disclosures of which are incorporated by reference in their entirety. The magneto-elastic torque sensor enables accurate measurements of torque exerted onto a rotating shaft without requiring a physical contact between a magnetic flux sensing element and the shaft. It should be understood that the torque sensor can be positioned differently from that shown in FIGS. 1 and 2 depending on a kinematic arrangement and sensor packaging considerations for a given transmission system to implement upshift control methods according to various embodiments of the present disclosure.

Controller 120 may communicate with and/or control one or more torque sources or producers, such as engine 11. In hybrid vehicle applications, torque sources may also include a traction motor (not shown) in communication with and/or controlled by controller 120. Various control functions illustrated and described herein may be integrated within a single controller, or may be distributed between or among multiple special-purpose controllers, depending on the particular application and implementation.

Controller 120 is sometimes referred to as an engine control module (ECM), powertrain control module (PCM) or vehicle systems controller (VSC), for example, and generally includes a microprocessor in communication with computer readable storage media, represented by RAM 126 and KAM 128. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the microprocessor to directly or indirectly control automatic transmission 10 and engine 11.

In one embodiment, the computer readable storage media include stored data representing instructions, software, or code executable by controller 120 to control upshifts of automatic transmission 10 using actuators 124 to engage and disengage one or more clutches or friction elements 25, 26 in response to signals from one or more sensors 122. In one embodiment, the control strategy implemented by the executable instructions or software commands an upshift event of the transmission and initiates torque phase control when a difference between a first transmission input shaft torque and a second transmission input shaft torque exceeds a first predetermined threshold parameter. The input shaft torque may be measured or calculated depending on the particular application and implementation as described in greater detail below.

As indicated, transmission 10 has a low gear configuration in FIG. 1 and a high gear configuration in FIG. 2. In the low gear configuration, OGC 25 acts as a reaction point for compound planetary gear set 18. The torque flow path in the powertrain is indicated in FIG. 1 by heavy directional lines. Torque is delivered during low gear operation from simple planetary gear set 12 to sun gear 20 of compound planetary gear set 18. Ring gear 19 delivers driving torque to output shaft 13.

During a synchronous upshift from the low gear configuration to the high gear configuration, OGC 25 is released and OCC 26 is engaged. At this time, sun gear 21 is braked by OCC 26. OCC 26 functions as a reaction point for compound planetary gear set 18. During this upshift from a low to high gear configuration, both the gear ratio and the torque ratio become lower.

In summary, FIG. 1 illustrates transmission 10 in a low gear configuration with high torque ratio. In the low gear configuration, OCC 26 (i.e., the high ratio clutch) is disengaged and OGC 25 (i.e., the low ratio clutch) is engaged. As a result, carrier 24 of pinion gears 22 of compound planetary gear set 18 is grounded, enabling torque transmission from sun gear 21 to output shaft 13 at a high torque ratio. FIG. 2 illustrates transmission 10 in a high gear configuration with low torque ratio. OCC 26 is engaged and OGC 25 is disengaged. As a result, sun gear 21 is grounded enabling torque transmission from sun gear 20 to output shaft 13 at low torque ratio. As shown in FIGS. 1 and 2, engine 11 is connected to transmission 10 by torque converter 14. Transmission 10 includes gear sets 12, 18 defining multiple torque flow paths from input shaft 29 to output shaft 13. As described in greater detail below, controller 120 is configured to initiate torque phase control when a difference between a first transmission input shaft torque and a second transmission input shaft torque exceeds a first predetermined threshold parameter during a shift event characterized by a preparatory phase, a torque phase and an inertia phase.

Figure 3:
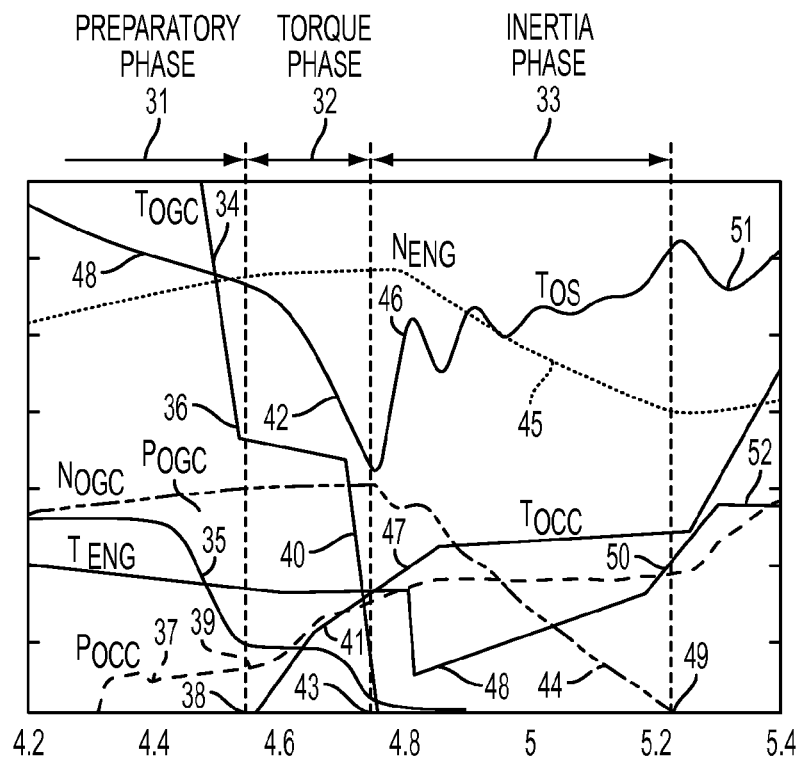
FIG. 3 illustrates a plot of a synchronous upshift event according to a prior art upshift control method for a conventional transmission.

Referring now to FIG. 3, a plot of a synchronous upshift event from the low gear configuration to the high gear configuration with a constant engine throttle setting according to a conventional upshift control method is shown. The variables plotted in FIG. 3 are characteristic of a conventional synchronous upshift control method. The prior art upshift control illustrated in FIG. 3 is described with respect to the schematic illustrations of a vehicle powertrain according to embodiments of the present disclosure illustrated in FIGS. 1 and 2.

The synchronous upshift event of FIG. 3 is divided into three phases: preparatory phase 31, torque phase 32, and inertia phase 33. Torque phase 32 is a time period when torque capacity of OGC 25 is controlled to decrease toward a value of zero for its disengagement. Preparatory phase 31 is a time period prior to torque phase 32. Inertia phase 33 is a time period when OGC 25 starts to slip, following torque phase 32. During preparatory phase 31, the torque capacity of OGC 25 is reduced, as shown at 34, by lowering hydraulic pressure 35 applied to its actuator to prepare for its release. The OGC 25 maintains enough torque capacity, however, to keep it from slipping at this time, as shown at 36. Simultaneously, OCC 26 hydraulic control pressure ($P_{OCC}$) is increased at 37 to stroke OCC 26 actuator, without assuming a significant torque capacity, to prepare for its engagement.

The torque phase 32 begins at an initial rise time ($t_{OCC}$) 38 when OCC torque capacity ($T_{OCC}$) starts rising. At the initial rise time, the OCC actuator may still be squeezing oil film between clutch plates with no detectable change in $P_{OCC}$ profile 39. This is because OCC can develop significant torque through viscous shear between clutch plates even before its actuator is fully stroked. It is known that this viscous torque is highly nonlinear with respect to $P_{OCC}$ due to a number of factors, such as the frictional characteristics of the clutch plates and transmission fluid, temperature, etc. Accordingly, it is difficult to accurately detect $t_{OCC}$ based on the measurements of $P_{OCC}$. During the torque phase 32, $T_{OGC}$ is further reduced 40 without slipping, maintaining the planetary gear set in the low gear configuration. However, the increasing $T_{OCC}$ 41 reduces net torque flow within the gear set. As a result, the output shaft torque ($T_{OS}$) drops significantly during the torque phase, creating the so-called torque hole 42. A large torque hole can be perceived by a vehicle occupant as an unpleasant shift shock.

The torque phase ends, hence the inertia phase begins, when OGC starts slipping at 43 (OGC slip not shown in the figure). Note that OGC may be allowed to slip before $T_{OGC}$ reaches zero at 43 if the load exerted onto OGC exceeds its torque-holding capacity $T_{OGC}$. During the inertia phase 33, OGC slip speed rises while OCC slip speed decreases toward zero 44. The engine speed drops 45 as the planetary gear configuration changes. During the inertia phase 33, the output shaft torque is primarily affected by $T_{OCC}$. This causes output shaft torque to rapidly move to the level 46 that corresponds to $T_{OCC}$ 47 at the beginning of the inertia phase.

FIG. 3 also shows reduced engine torque ($T_{ENG}$) 48 during the inertia phase. This is due to engine torque truncation by means of engine spark timing control according to a common practice in the conventional shift control method, enabling OCC to engage within a target time without requiring excessive torque capacity. When OCC completes engagement or when its slip speed becomes zero 49, the inertia phase 33 ends. The engine torque truncation is removed 50 and $T_{OS}$ moves to the level 51 that corresponds to a given engine torque level 52.

Figure 4:
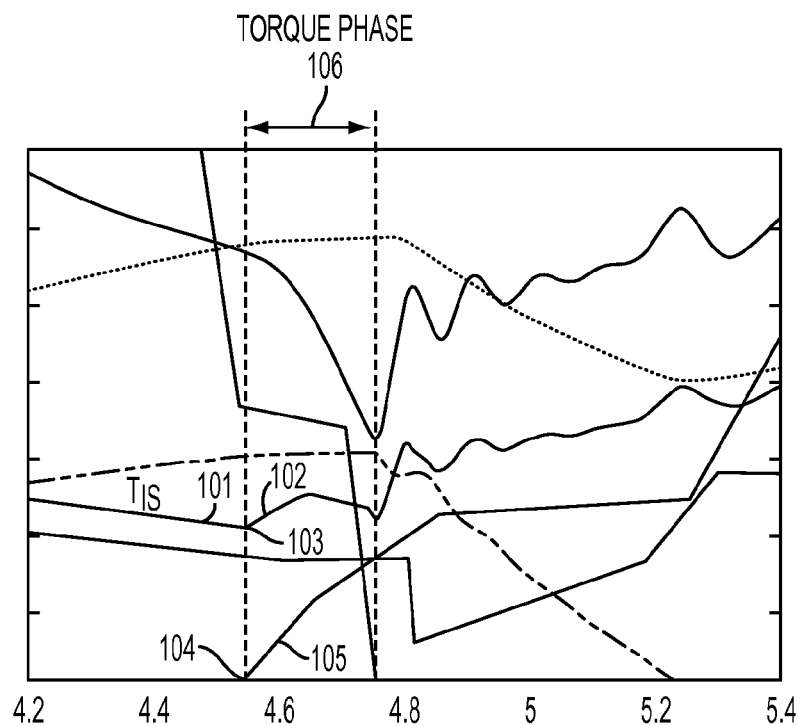
FIG. 4 illustrates operation of an upshift control system or method in accordance with embodiments of the present disclosure.

Referring now to FIG. 4, a method for detecting the initial rise time ($t_{OCC}$) of OCC torque capacity ($T_{OCC}$) during the upshift control from the low gear to high gear configurations for an automatic transmission system is shown. The shift control sequence is similar to that in FIG. 3. Input shaft torque ($T_{IN}$) 101, which is the same as turbine torque in this disclosure, may be measured by torque sensor 29 for applications including a torque sensor, or calculated using measured impeller speed, measured turbine speed, and torque converter characteristics. In one embodiment, the algorithm to calculate input shaft torque is described below in Eq. (1).

$$T_{IN}(\omega_{IMP}, \omega_{TURB}) = \frac{TQ_{RATIO}(\omega_{IMP}, \omega_{TURB}) \times \omega_{IMP}^2}{K_{FACTOR}(\omega_{IMP}, \omega_{TURB})}, \quad \text{Eq. (1)}$$

where $T_{IN}$: Input shaft torque $\omega_{IMP}$: Impeller speed $\omega_{TURB}$: Turbine speed $K_{FACTOR}$: Torque capacity factor of torque converter $TQ_{RATIO}$: Torque ratio determined in torque converter *charaterstics*

The torque converter is typically characterized through bench testing and its torque capacity factor and torque ratio are stored as a lookup table in computer readable storage accessible by controller 120 as a function of state variables such as a speed ratio between the impeller and the turbine of torque converter 14 (i.e., turbine speed/impeller speed). The impeller speed corresponds to the engine speed as the impeller of torque converter 14 is connected to engine 11. A turbine speed sensor or input shaft 29 speed sensor may be used to measure the turbine speed of torque converter 14.

The input shaft torque profile shows a slope change 102 or an upward blip, following an inflection point 103 when OCC torque capacity starts rising 104. The height and width of the blip 102 is directly affected by the slope 105 of OCC torque capacity. Various embodiments of the present disclosure as described in more detail in FIG. 5, monitor the impeller speed, turbine speed, and gear command, and detect the inflection point 103 in real time to identify the initial rise time, which defines the beginning of the torque phase 106. In response, controller 120 may systematically and adaptively adjust the OCC hydraulic pressure profile, and associated OCC torque capacity profile 105, to improve the detectability of the inflection point 103.

Figure 5:
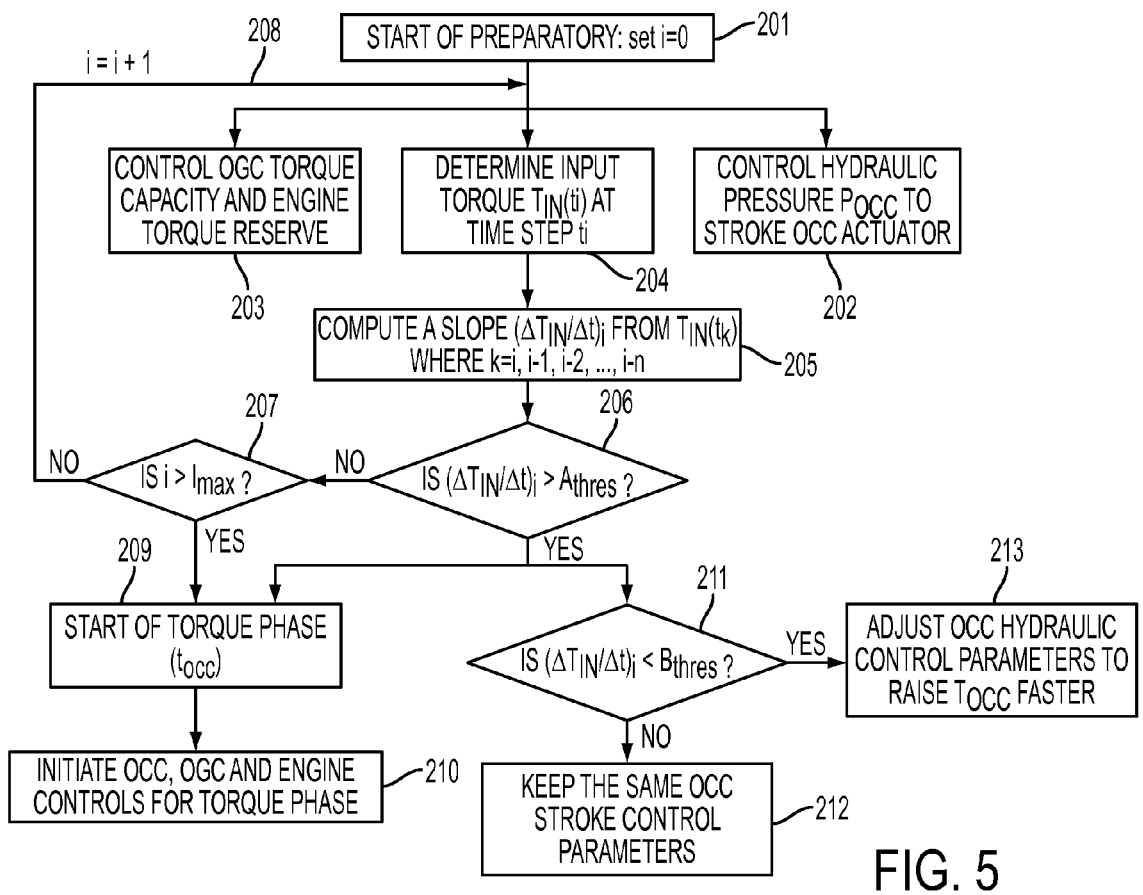
FIG. 5 illustrates a flowchart describing a control sequence operation of an upshift control system or method in accordance with an embodiment of the present disclosure.

Referring to FIG. 5, operation of a system or method for detecting the initial rise time ($t_{OCC}$) of OCC torque capacity ($T_{OCC}$) according to one embodiment of this disclosure is shown. As those of ordinary skill in the art will understand, the functions represented by the flow chart blocks may be performed by software and/or hardware. Depending upon the particular processing strategy, such as event-driven, interrupt-driven, etc., the various functions may be performed in an order or sequence other than illustrated in the Figure. Similarly, one or more steps or functions may be repeatedly performed, although not explicitly illustrated. In one embodiment, the functions illustrated are primarily implemented by software, instructions, or code stored in a computer readable storage medium and executed by one or more microprocessor-based computers or controllers to control operation of the vehicle.

Controller 120 initiates a shift event and defines the start of the preparatory phase (i=0) at 201. Controller 120 raises hydraulic pressure ($P_{OCC}$) of the OCC actuator to prepare for its engagement 202 while reducing OGC torque capacity and adjusting engine torque reserve as represented at 203. The controller then determines transmission input torque $T_{IN}(t_i)$ at control time step i or at time $t_i$ as represented at 204.

In some embodiments, transmission input torque $T_{IN}$ is measured by torque sensor 30. The input shaft torque signal provided by torque sensor 30 may be sampled at a desired frequency, which can be as fast as 1 msec, for example. In other embodiments, the input shaft torque signal is calculated based on measured impeller speed, measured turbine speed, and torque converter characteristics as previously described.

At 205, the controller computes a slope or a time derivative of the measured or calculated input torque $(\Delta T_{IN}/\Delta t)_i$ from $T_{IN}(t_i), T_{IN}(t_{i-1}), T_{IN}(t_{i-2}), \ldots, T_{IN}(t_{i-n})$ where a pre-selected parameter n defines the time interval $\Delta t = t_i - t_{i-n}$. A negative value of (i−n) indicates torque calculations prior to the preparatory phase. This is one example of an embodiment of this disclosure for detecting the initial rise time of OCC. A number of other approaches may be used to determine the slope change or upward blip that indicates the initial rise time of the OCC. The input shaft torque computation may also be triggered by gear command.

As previously described in reference to FIG. 4, the input shaft torque profile $T_{IN}$ exhibits an inflection point or an upward blip when $T_{OCC}$ starts rising. The controller compares the time derivative of the measured or calculated input torque $(\Delta T_{IN}/\Delta t)_i$ with a predetermined threshold parameter $A_{thres}$ at 206. If the time derivative of the calculated input torque $(\Delta T_{IN}/\Delta t)_i$ is less than the predetermined threshold parameter $A_{thres}$, the controller moves to 207 and examines whether the preparatory phase is timed out as compared with a predetermined interval $I_{max}$. That is, if the index i exceeds $I_{max}$, the controller ends the preparatory phase 209 and initiates torque phase control of OCC, OGC, and one or more torque sources, such as engine, at 210. Otherwise, the controller increments the value of i as i+1 and repeats the process as represented at 208. If the time derivative of the input torque $(\Delta T_{IN}/\Delta t)_i$ is greater than the predetermined threshold parameter $A_{thres}$ at 206, the inflection point is detected. The controller initiates torque phase control for OCC, OGC and engine 11 as represented at 210. The controller evaluates whether the time derivative of the input torque $(\Delta T_{IN}/\Delta t)_i$ is sufficiently large, compared with a pre-selected parameter $B_{thres}$ 211. If so, it retains OCC stroke control parameters 212. If not, it adjusts OCC hydraulic control parameters 213 to increase the initial slope of $T_{OCC}$ for improved detectability of the inflection point for subsequent shift events.

Figure 6:
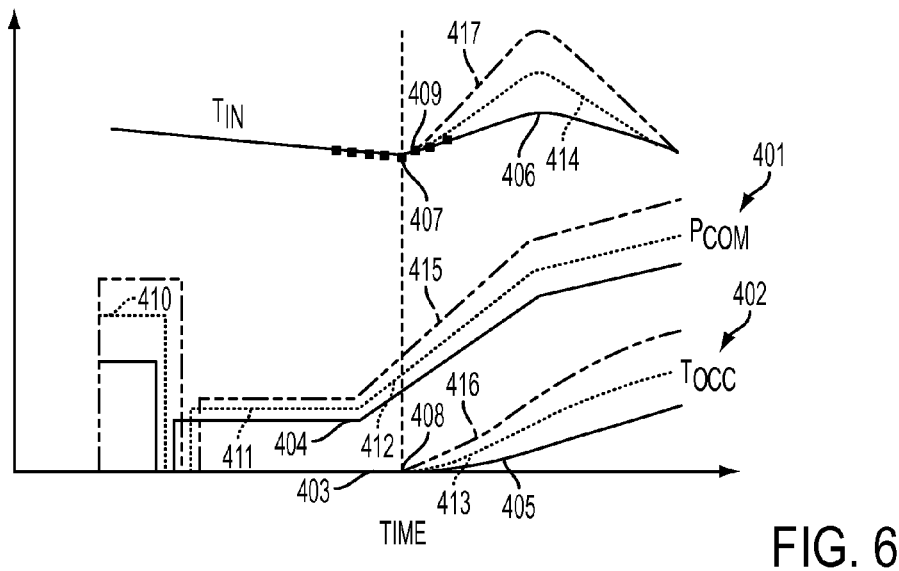
FIG. 6 illustrates the relationship between the pressure and transmission input torque profiles in accordance with embodiments of the present disclosure.

Referring to FIG. 6, an illustrative embodiment of the relationship between the commanded pressure ($P_{COM}$), OCC torque capacity ($T_{OCC}$) and input shaft torque ($T_{IN}$) profiles according to various embodiments of the present disclosure is shown. The commanded pressure profile $P_{COM}$ 401 leads to $T_{OCC}$ 402. In one example, the $T_{OCC}$ remains at zero level 403 when the commanded pressure level starts increasing 404. Because of a relatively slow rise of $T_{OCC}$ 405, the input torque profile $T_{IN}$ 406 shows a relatively small slope change after the inflection point 407. This makes it more difficult to consistently detect the initial rise time ($t_{OCC}$) of $T_{OCC}$ 408 based on $T_{IN}$ 409. The control strategy according to embodiments of the present disclosure as illustrated in FIG. 5 adjusts the commanded OCC pressure profile ($P_{COM}$), including boost phase 410, stroke level 411, and initial slope 412, to raise $T_{OCC}$ a little faster 413. This results in a larger slope change 414 in $T_{IN}$ after the inflection point 407. However, if the amount of the slope change is still below a chosen threshold $B_{thres}$, the commanded pressure profile $P_{COM}$ is adjusted 415 to further raise the initial slope of $T_{OCC}$ 416. This leads to an even larger slope change in $T_{IN}$ 417 for improved detectability of the inflection point 407 or $t_{OCC}$ 408. Note that the threshold parameter $B_{thres}$ must be carefully determined to enhance the detectability of $t_{OCC}$ while avoiding overly aggressive $T_{OCC}$ rise which may result in a harsh shift quality.

For embodiments that calculate the input shaft torque, an alternative method to detect the initial rise time ($t_{OCC}$) of OCC is based on a comparison between a first input shaft torque ($T_{IN}$) computed according to Eq. (1) and a second input shaft torque ($T^*_{IN}$) calculated from measured vehicle acceleration, measured transmission input speed, and measured output shaft speed. Specifically, in one embodiment the second input shaft torque ($T^*_{IN}$) is computed from Eq. (2) that is described below.

$$T^*_{IN}(a_{VEH}, m_{VEH}, r_{TIRE}) = \frac{a_{VEH} \times m_{VEH} \times r_{TIRE}}{FD_{RATIO} \times G_{RATIO}}, \quad \text{Eq. (2)}$$

where $T_{IN}$: Input shaft torque $a_{VEH}$: Vehicle accleration $m_{VEH}$: Vehicle mass $r_{TIRE}$: Tire effective radius $FD_{RATIO}$: Final drive ratio in driveline $G_{RATIO}$: Speed ratio between transmission input and output shafts Referring to FIG. 7, an embodiment depicting two input shaft torque profiles ($T_{IN}$ and $T^*_{IN}$) calculated using measurements from a vehicle is shown. The two input shaft torque profiles are close before the torque transfer phase 504. The first input shaft torque ($T_{IN}$) 501 starts deviating 503 from the second input shaft torque ($T^*_{IN}$) 502 at the beginning of the torque transfer phase 504. Once the OCC starts carrying torque, the actual torque ratio inside the transmission begins to change, but the speed ratio between transmission input and output shafts is not changed until the torque transfer from the OGC to the OCC is completed. The speed ratio used in Eq. (2) stays at the ratio of the low gear configuration during the torque transfer phase. Because the second input torque ($T^*_{IN}$) computed according to Eq. (2) does not consider the varying actual torque ratio, the two input shaft torque profiles become different when the actual torque ratio starts changing at the beginning of the torque phase. Therefore, this point can be used as the initial rise time ($t_{OCC}$) of OCC.

Referring to FIG. 8, operation of a system or method for detecting initial rise time of OCC according to an alternative embodiment of the present disclosure is shown. In this embodiment, the controller computes the difference between two calculated input shaft torques, rather than using the slope of the measured or calculated input shaft torque as depicted in the embodiment of FIG. 5.

In the representative control strategy illustrate in FIG. 8, the controller computes two input shaft torques $T_{IN}$ and $T^*_{IN}$ 604 and calculates the difference between the torques ($T_{IN}$($t_i$)−$T_{IN}^*$($t_i$)) at control time step i or at time $t_i$ 605. The controller compares the computed differences with a predetermined threshold parameter $A_{thres}$ at 606. If the difference between the torques ($\Delta T_{IN}(t_i)$) is less than a threshold $A_{thres}$, the controller moves to 607 and examines whether the preparatory phase is timed out as compared with a predetermined interval $I_{max}$. That is, if the index i exceeds $I_{max}$, the controller ends the preparatory phase 609 and initiates torque phase control of OCC, OGC, and engine at 610. Otherwise, the controller increments the value of i as i+1 and repeats the process 608. If the difference between the torques ($\Delta T_{IN}(t_i)$) is greater than the threshold $A_{thres}$ at 606, the inflection point is detected and the controller initiates torque phase controls for OCC, OGC, and engine 11 as represented at 610 in response. The controller evaluates whether the difference between the torques ($\Delta T_{IN}(t_i)$) is sufficiently large, compared with a pre-selected parameter $B_{thres}$ 611. If so, OCC stroke control parameters are retained or left unchanged as indicated at 612. If not, the OCC hydraulic control parameters are adjusted at 613 to increase the initial slope of $T_{OCC}$ for improved detectability of the inflection point for subsequent shift events. Note that both the first input shaft torque ($T_{IN}$) calculated according to Eq. (1) and the second input shaft torque ($T^*_{IN}$) calculated according to Eq. (2) may be normalized to have the same baseline level before the torque phase to improve the detectability of $t_{OCC}$.

It is to be understood that the disclosure is not limited to the exact shift control methods which have been illustrated and discussed in this disclosure, but that various modifications may be made without departing from the spirit and the scope of the disclosure. It is to be understood that the invented method may be combined with a conventional shift control method for adjusting OCC clutch control parameters during the preparatory phase through closed-loop, open-loop or adaptive schemes for balancing the detectability of $t_{OCC}$ with desired shift quality and drivability targets.

As can be seen by the representative embodiments described, embodiments according to the present disclosure provide various advantages related to more accurate indication or detection of torque phase based on initial rise time of the on-coming clutch torque capacity. More robust detection of the torque phase facilitates control of other torque-generating devices, including an engine, clutches, and an electric motor in hybrid vehicle applications to provide better synchronization of the OGC and OCC during shifting. Use of an induced slope change in the input torque profile according to various embodiments facilitates more robust detection of initiation of the torque phase of an upshift.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure. While the best mode has been described in detail, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments discussed herein that are described as less desirable than other embodiments or prior art implementations with respect to one or more characteristics are not outside the scope of the disclosure and may be desirable for particular applications.

What is claimed is:

1. A vehicle powertrain, comprising:
an engine;
a transmission coupled to the engine by a torque converter, the transmission having gear sets defining multiple torque flow paths from an input shaft of the transmission to an output shaft of the transmission; and
a controller configured to initiate torque phase control of an off-going element and an on-coming element when a difference between a first calculated transmission input shaft torque and a second calculated transmission input shaft torque exceeds a first predetermined threshold parameter during a shift event from a transmission shift preparatory phase to a transmission torque phase.

2. The vehicle powertrain of claim 1, wherein the controller is further configured to initiate the torque phase control when the difference between the first calculated transmission input torque and the second calculated transmission input torque is below the first predetermined threshold parameter for a predetermined time period after initiation of the transmission shift preparatory phase.

3. The vehicle powertrain of claim 1, wherein the controller is further configured to initiate the torque phase control when a time derivative of the first calculated transmission input shaft torque exceeds a corresponding threshold.

4. The vehicle powertrain of claim 1, wherein the first calculated transmission input shaft torque is based on a measured impeller speed and a measured turbine speed of the torque converter.

5. The vehicle powertrain of claim 1, wherein the second calculated transmission input shaft torque is based on measured vehicle acceleration, transmission input shaft speed, and transmission output shaft speed.

6. The vehicle powertrain of claim 1, wherein initiating torque phase control includes synchronously controlling the off-going element, the on-coming element, and the engine.

7. The vehicle powertrain of claim 1, further comprising:
the controller configured to adjust control parameters of the on-coming element when the difference between the first calculated transmission input torque and the second calculated transmission input torque is below a second predetermined threshold parameter during the shift event.

8. A method for controlling a vehicle having an engine and transmission, comprising:
initiating torque phase control, by a controller, of an off-going clutch and an on-coming clutch when a difference between a first calculated transmission input shaft torque and a second calculated transmission input shaft torque exceeds a first predetermined threshold parameter during a shift event from a transmission shift preparatory phase to a transmission torque phase.

9. The method of claim 8, wherein the first calculated transmission input shaft torque is based on measured torque converter impeller speed, measured torque converter turbine speed, a stored torque converter torque capacity factor, and a torque converter torque ratio.

10. The method of claim 8, wherein the second calculated transmission input shaft torque is based on measured vehicle acceleration, transmission input shaft speed, and transmission output shaft speed.

11. The method of claim 8, further comprising:
initiating torque phase control of the off-going clutch and the on-coming clutch when the difference between the first calculated transmission input shaft torque and the second calculated transmission input shaft torque is below the first predetermined threshold parameter during the shift event and the transmission shift preparatory phase of the shift event has timed out.

12. The method of claim 8, further comprising:
initiating torque phase control when a time derivative of the first calculated transmission input shaft torque exceeds a corresponding threshold.

13. The method of claim 8, further comprising:
initiating torque phase control when a time derivative of the first calculated transmission input shaft torque is below a corresponding threshold and the transmission shift preparatory phase of the shift event has timed out.

14. The method of claim 8, further comprising:
synchronizing timing of raising torque capacity of the on-coming clutch for engagement while reducing torque capacity of the off-going clutch for disengagement during the torque phase.

15. The method of claim 8, further comprising:
adjusting control parameters of the on-coming clutch when the difference between the first calculated transmission input torque and the second calculated transmission input torque is below a second predetermined threshold parameter during the shift event.

* * * * *